Patented May 13, 1930

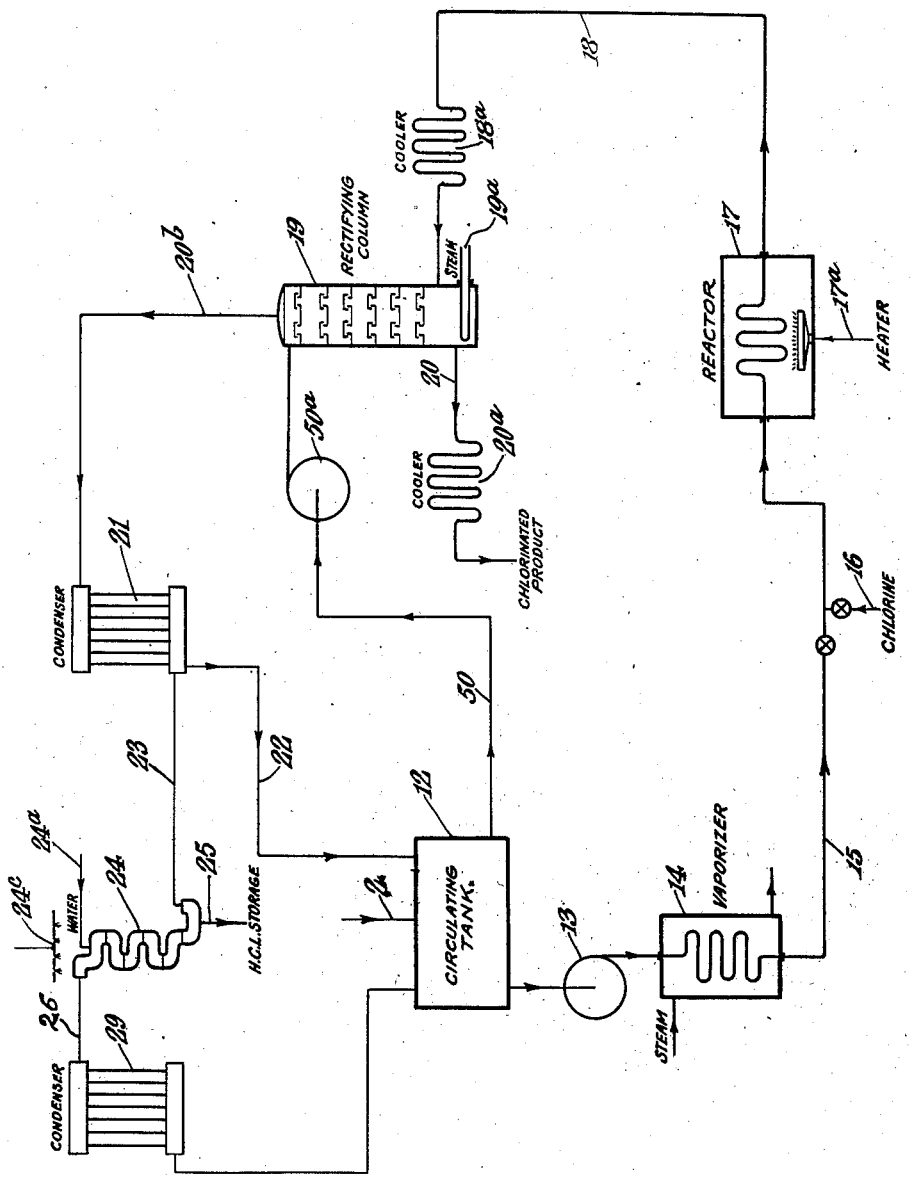

1,758,351

UNITED STATES PATENT OFFICE

CHARLES L. CAMPBELL, OF BOSTON, MASSACHUSETTS, ASSIGNOR TO E. B. BADGER & SONS COMPANY, OF BOSTON, MASSACHUSETTS, A CORPORATION OF MASSACHUSETTS

CHLORINATION

Application filed June 15, 1927. Serial No. 198,913.

My invention relates to the chlorination of substances and particularly to chlorination of substances while they are in vapor phase.

In the chlorination of substances by substitution, for example, in the chlorination of hydrocarbons of the paraffin series having one to seven or eight carbon atoms, the products of the chlorinating reaction include various chlorides of the substance to be chlorinated, hydrogen chloride, and some of the substance to be chlorinated that is not chlorinated in its passage through the chlorinating reaction and which it is desirable to return to the chlorinating reaction, it being desirable to prevent the introduction of moisture into the chlorinating reaction because aqueous hydrochloric acid injurious to the equipment would be formed thereby. If chlorinated products are returned to the chlorinating reaction those products will be converted into higher chlorides but such a result is extremely undesirable where monochlorides are sought to be produced. Furthermore, undesirable olefins and decomposition products may be produced by returning chlorinated products to the chlorinating reaction. It is desirable therefore to remove chlorinated substances from the products of chlorination before returning any part of such products to the chlorinating reaction. Hydrogen chloride is advantageously removed from the products of chlorination by contacting the products with water and thereby absorbing the hydrogen chloride with the production of aqueous hydrochloric acid. Such treatment, however, contaminates with moisture the products of chlorination and any unchlorinated substance therein that is to be returned to the chlorinating step. It is desirable, therefore, to remove from the products of chlorination, prior to absorption therefrom of hydrogen chloride with water, such substances to be chlorinated as are not chlorinated in their first passage through the chlorinating reaction and which are advantageously returned to the chlorinating reaction. It is now recognized that if those constituents of the products of chlorination which enter the hydrogen-chloride-absorption step contain a substance that will form a film on water the complete absorption of hydrogen chloride and the production of aqueous hydrochloric acid of desirable concentration will be prevented. It is known that the undesirable effect of such a film-forming substance may be avoided by maintaining such substance in vapor phase during the absorption operation. However, the simplest known steps for maintaining film-forming substance in vapor phase during the absorption operation consist in regulation of the temperature at which absorption is carried out and in introduction of substances of high vapor pressure into the absorption apparatus, and the presence in the absorber of chlorinated substances having higher boiling temperatures than the unchlorinated substances would make difficult or defeat an effort to maintain all film-forming substances in vapor phase in the absorber. It might be impossible to maintain some monochlorides in vapor phase and almost certainly impossible to keep higher chlorides in vapor phase at a temperature at which a quantity of absorption water producing acid of desired strength would sufficiently remove hydrogen chloride from the products of chlorination. It is desirable therefore to remove chlorinated substances from the products of chlorination prior to removal of hydrogen chloride therefrom. Residual constituents of the products of chlorination passing from the operation wherein hydrogen chloride is removed from such products by absorption with water, include some of the substance to be chlorinated, which was not chlorinated in its passage through the chlorinating reaction, and it is advantageous to return such residual substance to the chlorinating reaction but it is desirable that it shall be free of chlorinated substances for the reasons above set out and desirable that it shall constitute as small a fraction as possible of the unchlorinated substance passing from the chlorinating reaction because it becomes moisture laden through its contact with water.

An important object of my invention is to provide a process and apparatus for the practice thereof whereby the disadvantages above set out may be avoided and the advantageous operation above described may be carried out in the chlorination of substances.

To assist in the understanding of my invention there is shown diagrammatically in the single figure of the drawing apparatus embodying my invention and whereby my process may be practiced. In order to simplify the description of my apparatus and of my process I will describe my invention in connection with the chlorination of pentanes, but it is to be understood that my invention is not limited to such operation but is applicable to the chlorination of other substances and is susceptible to all modifications in form and procedure which fall within the spirit of my invention.

A substance to be chlorinated, for example, a mixture of pentanes, may be maintained in circulating tank 12 from which it is passed by pump 13 to vaporizer 14 which may be heated in any suitable manner as by the circulation of steam. The vapor of pentanes is then passed through pipe 15 into which chlorine vapor is introduced by pipe 16 and the mixture passes to reactor 17 in which the reaction is caused by any desired agent, such as heat or light. From the reactor 17 products of chlorination pass through pipe 18 to a cooler 18$^a$ from which the vapors, preferably cooled to a temperature corresponding to or above the saturation point thereof at the pressures employed, e. g., 85° C. under 15 pounds pressure in the chlorination of pentanes, are introduced into rectifying column 19. A reflux of pentanes, for example, is maintained in the rectifying column 19 by pentane passed from circulating tank 12 through pipe 50 to the upper part of the rectifying column 19 by pump 50$^a$.

I have found that by introducing all of the vapors of the chlorinating reaction into a rectifying column, substantially all of the chlorinated substance may be removed from the products of chlorination prior to the absorption of hydrogen chloride from those products preliminary to returning unchlorinated substances to the chlorinating step. If the products of chlorination were cooled even enough to condense the chlorinated substances and permit the withdrawal of hydrogen chloride, all prior to introduction of the chlorinated substances into a rectifier, the hydrogen chloride would contain vapors of chlorinated substances and vapors of unchlorinated substances and the eventual return of the unchlorinated substances to the chlorinating reaction would result in introduction of chlorinated substances into the chlorinating reaction. Furthermore, such operation would require the subsequent addition of an unnecessarily large amount of heat in the bottom of the rectifier to revaporize liquids introduced therein. I have found, moreover, that in the chlorination of pentane, a careful rectification in the manner herein described is essential to the complete separation of amyl chlorides from the products of chlorination.

In the practice of my invention, the chlorinated substances and some unchlorinated substances are withdrawn from the rectifier through pipe 20 and passed to storage, being further cooled in a suitable cooler 20$^a$ if desired. Unchlorinated substances in the liquid passing out of rectifier 19 through pipe 20 may be removed in part, or substantially entirely, by rectification from the chlorinated substances according to requirements. Additional heat may be supplied to the liquid in the bottom of the rectifying column 19 by a steam coil 19$^a$ if such addition of heat is necessary. Vapors pass from the top of rectifying column 19 through pipe 20$^b$ to a condenser 21 in which as much as possible of the unchlorinated substance still remaining in the products of chlorination is condensed and withdrawn through pipe 22 to circulating tank 12. I have found, particularly in the chlorination of pentanes, that careful removal of chlorinated substances by rectification is essential in order that unchlorinated substances condensed in condenser 21 and passed therefrom to circulating tank 12 shall be sufficiently free of chlorinating substances.

Vapors passing from condenser 21 through pipe 23 consist mainly of dry hydrogen chloride saturated with vapors of unchlorinated substances and they are introduced into any suitable absorber 24 to which water is supplied through pipe 24$^a$ and from which aqueous hydrochloric acid is withdrawn through pipe 25, the temperature in the absorber being controlled by cooling water from pipe 24$^c$. Vapors passing from absorber 24 through pipe 26 consist mainly of unchlorinated substance which may advantageously be returned to the chlorinating step and those vapors are condensed in condenser 29 and returned to circulating tank 12, being neutralized and dehydrated, if desired, prior to introduction into circulating tank 12.

Additional quantities of substance to be chlorinated may be introduced into circulating tank 12 by pipe 2.

Referring to the chlorination of pentanes as a specific application of my invention, the mixture of pentane vapor and chlorine may be introduced into the reactor in the proportion of 15 to 20 parts of pentane vapor to each part of chlorine vapor and at 60 to 75 pounds gauge pressure at 70 to 85° C., being brought to 275° C. to 325° C. in the reactor by means of a gas burner 17$^a$. Then the products of chlorination may be cooled to 75° C. to 90° C. before they are introduced into the rectifying column. The pentane refluxed to the rectifying column may be at atmospheric temperature. The vapors passing from the rectifying column 19 may have a temperature corresponding to the boiling point of pentane at the presure employed and the vapors passing from condenser 21 may have a temperature not substantially higher than the temperature of the cooling water.

While I have described in great detail my process and apparatus embodying my invention, I do not intend that my invention shall be limited to such details but intend that it shall include such modifications and variations as fall within the hereunto appended claims inasmuch as my invention is applicable to the chlorination of various substances and, in the light of my invention, modifications desirable in the chlorination of substances other than pentanes will readily occur to those skilled in the art.

What I claim as new and desire to secure by Letters Patent of the United States is:

1. In vapor phase chlorination of organic substances, the process comprising subjecting the products of the chlorinating reaction to rectification prior to cooling the same to a temperature below the saturation point thereof, and by cooling in said rectifying operation obtaining a liquid fraction containing organic chlorinated substances and a vapor fraction substantially free of organic chlorinated substances.

2. In vapor phase chlorination of organic substances, the process comprising cooling together the products of the chlorination reaction to a point not below the saturation point thereof, and then subjecting the vapors together to rectification and thereby producing, by additional cooling and by maintaining a reflux of the unchlorinated organic substances, a liquid fraction containing organic chlorinated substances and a vapor fraction substantially free of organic chlorinated substances.

3. In vapor phase chlorination of organic substances, the process comprising subjecting the products of the chlorinating reaction to rectification prior to cooling the same to a temperature below the saturation point thereof, and by cooling in said rectifying operation and while maintaining a reflux of unchlorinated organic substances in said operation, obtaining a liquid fraction containing organic chlorinated substances and a vapor fraction substantially free of organic chlorinated substances.

4. In vapor phase chlorination of organic substances, the process comprising subjecting the products of the chlorinating reaction to rectification prior to cooling the same to a temperature below the saturation point thereof, and by cooling and by maintaining a reflux of the unchlorinated organic substances in said rectifying operation obtaining a liquid fraction containing organic chlorinated substances and a vapor fraction substantially free of chlorinated organic substances and containing hydrogen chloride, and then removing hydrogen chloride from the substances contained in said vapor fraction.

5. In vapor phase chlorination of organic substances, the process comprising subjecting the products of the chlorinating reaction to rectification prior to cooling the same to a temperature below the saturation point thereof, and by cooling and by maintaining a reflux of the unchlorinated organic substances in said rectifying operation obtaining a liquid fraction containing organic chlorinated substances and a vapor fraction substantially free of chlorinated organic substances and containing hydrogen chloride, removing unchlorinated organic substances from said vapor fraction, and then removing hydrogen chloride from the residue of said vapor fraction.

6. In the chlorination of pentanes, the process comprising subjecting the products of the chlorinating reaction to rectification prior to cooling the same to a temperature below the saturation point thereof and thereby producing a liquid fraction of liquid products containing chlorine products derived from pentane and producing a vapor fraction substantially free of chlorine products derived from pentane.

7. In the chlorination of pentanes, the process comprising subjecting to rectification all of the products in the chlorinating reaction prior to cooling the same to a temperature below the saturation point thereof while maintaining a reflux of pentane in said rectifying operation and thereby producing a liquid fraction containing chlorine products derived from pentane and a vapor fraction substantially free of chlorine products derived from pentane.

8. In the chlorination of pentanes, the process comprising subjecting to rectification all of the products in the chlorinating reaction prior to cooling the same to a temperature below the saturation point thereof while maintaining a reflux of pentane in said rectifying operation and thereby producing a liquid fraction containing chlorine products derived from pentane and a vapor fraction substantially free of chlorine products derived from pentane and containing hydrogen chloride, and then removing hydrogen chloride from the substances contained in said vapor fraction.

9. In the chlorination of pentanes, the process comprising subjecting to rectification all of the products in the chlorinating reaction prior to cooling the same to a temperature below the saturation point thereof while maintaining a reflux of pentane in said rectifying operation and thereby producing a liquid fraction containing chlorine products derived from pentane and a vapor fraction substantially free of chlorine products derived from pentane and containing hydrogen chloride and pentanes, withdrawing pentanes from the substances contained in said vapor fraction, and then removing hydrogen chloride from the resulting residue.

10. In the chlorination of pentane, the process comprising subjecting to rectification all of the products in the chlorinating reaction prior to cooling the same to a temperature below the saturation point thereof while maintaining a reflux of pentane in said rectifying operation and thereby producing a liquid fraction containing chlorine products derived from pentane and a vapor fraction substantially free of chlorine products derived from pentane, and containing hydrogen chloride, then removing hydrogen chloride from the substances contained in said vapor fraction and containing hydrogen chloride and pentanes, withdrawing pentanes from the substances contained in said vapor fraction, then removing hydrogen chloride from the resulting residue and returning to the chlorinating operation the pentanes freed of hydrogen chloride.

In testimony whereof, I have signed my name to this specification.

CHARLES L. CAMPBELL.